Sept. 7, 1937.  W. BROWN  2,092,204

AIRPLANE

Filed April 18, 1936  2 Sheets-Sheet 1

INVENTOR.

William Brown

Sept. 7, 1937.  W. BROWN  2,092,204
AIRPLANE
Filed April 18, 1936   2 Sheets-Sheet 2

INVENTOR.
William Brown

Patented Sept. 7, 1937

2,092,204

UNITED STATES PATENT OFFICE 2,092,204

AIRPLANE

William Brown, Irvington, N. J.

Application April 18, 1936, Serial No. 75,120

5 Claims. (Cl. 244—102)

This invention relates to airplanes and more particularly to the landing gear thereof, the primary object of the invention being the provision of a stream-lined covering or shield for the protruding landing wheels.

A further object of the invention is the provision of a stream-lined shield for the landing wheels of an airplane which are drawn up into the wing structure or other convenient part of the airplane, when not in use, that is, when the airplane is about to land or when taking off.

A still further object of the invention is the provision of stream-lined shields for the landing wheels of an airplane, these shields being adapted to be used on wheels which are drawn up into the airplane structure with approximately half their diameter protruding during normal flying conditions.

A still further object of the invention is the provision of stream-lined shields for retracting landing wheels of an airplane, the shields being drawn up into the airplane structure when landing or taking off when the wheels are extended but covering the wheels during normal flight when the wheels are retracted, it being understood that when the wheels are in retracted position, approximately one-half of the diameter of the wheels protrudes downwards below the wing or fuselage.

A still further object of the invention is the provision of stream-lined shields for airplane landing wheels in which the wheels are shielded from both the front and rear ends, the shields covering the wheels in a clam-shell movement.

A still further object of the invention is the provision of a stream-lined shield for airplane landing wheels which automatically brakes the wheels, preventing them from turning, when the shields are applied.

With these and other objects in view, the invention consists in the features of construction, combination and arrangement of parts as will be hereinafter more fully described in detail, illustrated in the accompanying drawings, which disclose the preferred embodiment of the invention, and pointed out in the appended claims.

In the accompanying drawings:—

Figure 5 illustrates the retractible landing wheel mechanism with shield in position.

Figure 1:
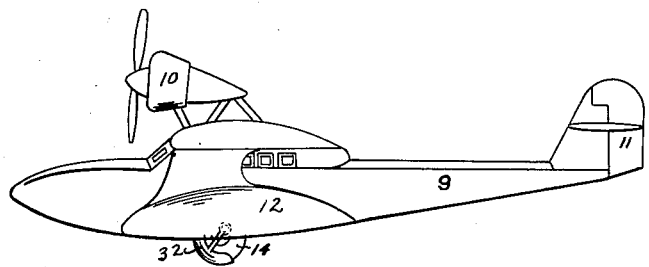
Figure 1 shows a general elevation of an airplane equipped with my stream-lined shield.
Figure 2:
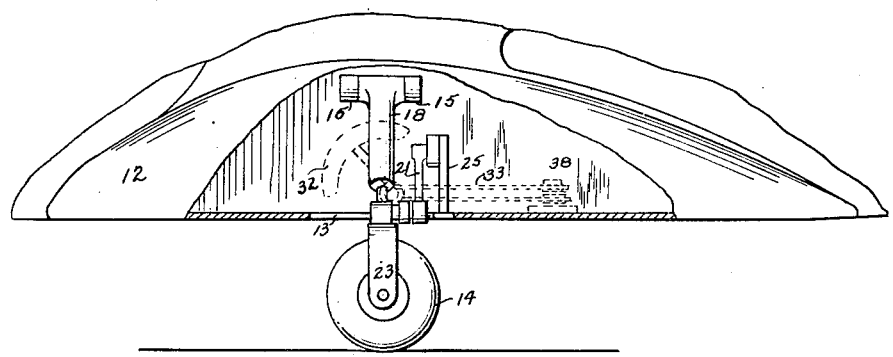
Figure 2 shows a vertical cross-sectional view through a wing of the airplane, showing the landing wheel extended and the shield retracted into the wing structure, a position for landing or taking off.
Figure 3:
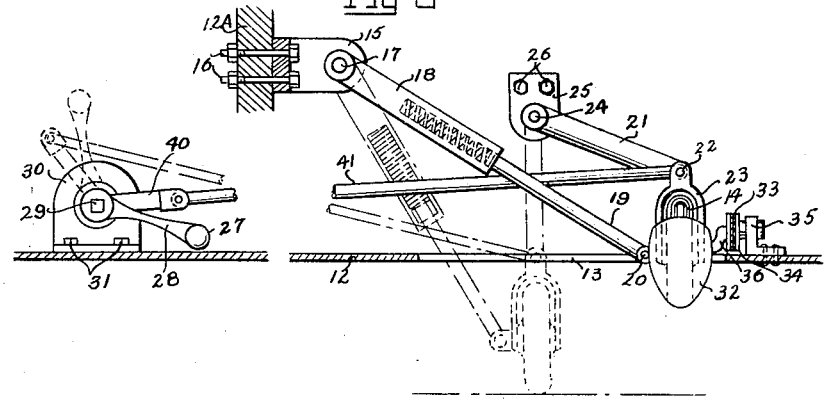
Figure 3 illustrates a fore and aft shield covering the landing wheel, during flight.

Referring to the drawings in which like numerals refer to similar parts throughout the several views, the numeral 9 denotes the fuselage of an airplane and provided with the usual parts, such as the motor 10, rudder 11 and wings 12. The lower side of the wing 12 is provided with the usual well hole 13 into which the landing wheels 14 are retracted for the purpose of reducing wind resistance and naturally increasing the speed of the airplane as well as creating better control while in flight. However, for the sake of safety, it is customary and desirable for approximately one-half of the landing wheels 14 to remain protruding beneath the lower side of the wing as more particularly illustrated in Figures 1 and 3. Under such conditions, while the air resistance has been naturally reduced, yet there is sufficient air resistance left to be objectionable with the added annoyance that the landing wheels commence to revolve while the airplane is in flight, due to unequal wind pressures at different parts of the wheel. My invention is designed to overcome these objections and, due to the ever increasing speed of airplanes, the removal of these aforementioned objections will considerably decrease the air resistance and correspondingly increase the speed with resultant economy in operation.

To a suitable portion of the wing structure 12A is mounted a bracket 15 secured by bolts 16 as more clearly illustrated in Fig. 5. A pin 17 is secured to the bracket as shown and pivoted to same is the socket arm 18 into which the plunger 19 operates in the usual manner of landing gears. To the other end of the plunger 19 is pivoted at 20, the landing wheel 14. The usual retractor arm 21 is pivoted at 22 to the wheel fork 23, while the other end of the arm 21 is pivoted at 24 to the bracket 25, also securely attached to any convenient portion of the wing structure 12A by means of bolts 26. The full lines in Figure 5 show the landing wheel 14 in fully retracted position while the dotted lines illustrate the extended position of the wheel.

The retraction and extension of the landing wheel is manually accomplished by means of the handle 27 attached to the crank arm 28 which in turn is secured to shaft 29 turning in bracket 30 which is secured to the lower portion of the wing 12 by means of bolts 31. A crank arm 40 is secured to the shaft 29 and to the end of which arm is pivoted the rod 41, the other end of the rod being pivoted at 22. When the handle 27 is pulled upward, as indicated by the dotted lines, the wheel will be extended as also indicated by the co-related dotted lines.

Figure 6:
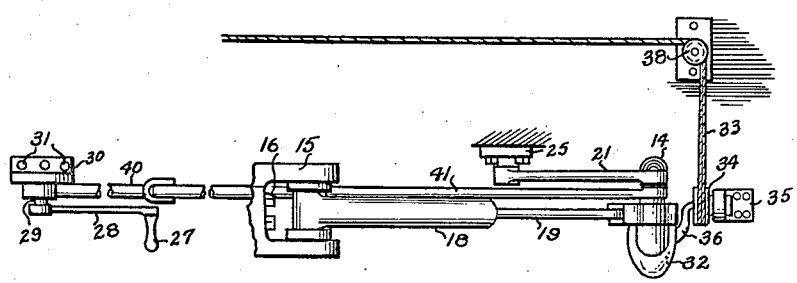
Figure 6 is a top view of Figure 5.
Figure 3:
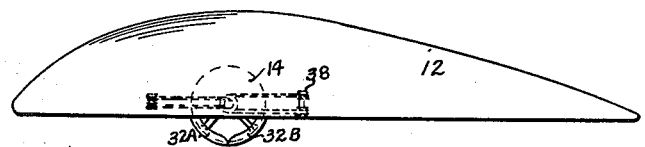
Figure 4:
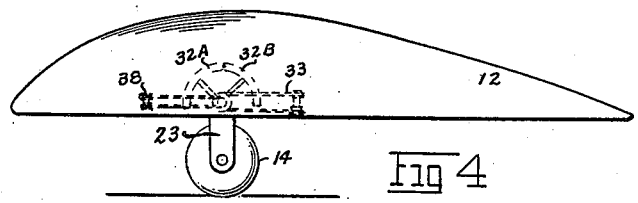
Figure 4 illustrates the relative positions of the fore and aft shields to the extended landing wheels when on the ground.

Now, in order to decrease wind friction and prevent the wheel from revolving while the airplane is in flight, wheels being in retracted position, I provide a shield 32, which is capable of swinging downward over the wheel while in this retracted position. This is accomplished by merely pulling the cord or rope 33 which runs over the pulley 34 which in turn is revolvably mounted on the bearing bracket 35, this bracket being also secured to the lower end of the wing 12 as more particularly illustrated in Figures 5 and 6. Pulling the cord 33 in one direction will swing the shield 32 downwards to cover the wheel, while pulling the cord in the opposite direction will swing the shield upward into the wing structure and out of the way of the landing wheel 14.

Figures 7, 8:
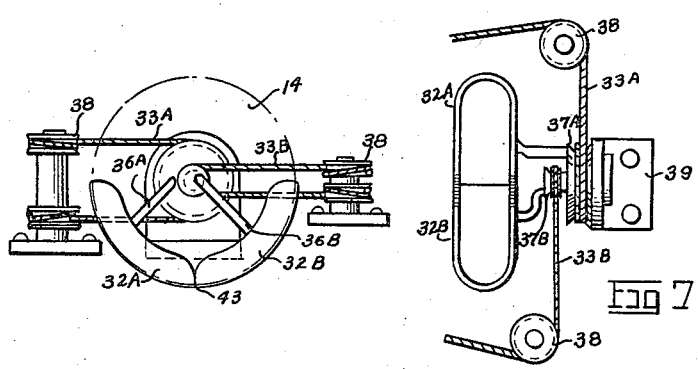
Figure 7 is a top view of the shield operating mechanism.
Figure 8 is an elevation of Figure 7.

In Figures 3, 4, 7 and 8 are illustrated double shields, that is, two quarter-sector shields 32A and 32B which operate simultaneously, one shield covering the front of the wheel while the other shield covers the rear circumference of the wheel as more clearly illustrated in Figure 8. These shields operate on the familiar clamshell bucket principle, each shield being attached to an arm 36A and 36B, the arm 36A being secured to pulley 37A while arm 36B is secured to pulley 37B, each shield being separately or simultaneously operated by pulling the rope 33A or 33B respectively. Suitable pulleys 38 provide the necessary tension and convenient facility for the operation of the ropes 33. The pulleys 37A and 37B are mounted to the bracket 39 as clearly illustrated in Figure 7.

It will of course be understood that suitable levers may be substituted for the ropes 33 and pulleys 37 and 38 in the operation of the shields 32. Also, by attaching the rope 33 to the crank arm 40, the shields may be operated simultaneously with the retraction and extension of the wheels 14.

In order to prevent the wheel 14 revolving while the airplane is in flight, the shields 32 are mounted slightly eccentric to the exact center of the pulleys 34, 37A and 37B so that meeting edges 43 of the shields 32 will clamp the wheel 14, (see Fig. 8).

From the foregoing description, it will be apparent that I have evolved a stream-lined shield for airplane wheels which are operable at will by the pilot, which reduces wind resistance to a minimum and which will incidentally prevent the wheel from turning while the airplane is in flight.

While this specification sets forth in detail the present and preferred construction of the device, still in practice such deviations from such details may be resorted to as do not form a departure from the spirit of the invention, as defined by the appended claims.

What I claim is:—

1. In an airplane provided with retractable landing gear, the wheels of said landing gear being partly exposed below the streamline of said airplane when in retracted position, an extensible shield adapted to cover the front portion of each wheel when said gear is in retracted position, and means for retracting said shield within the airplane structure when said landing gear is to be extended, said means comprising a pulley axially in line with the landing wheel when in retracted position, an arm extending from the pulley, a shield attached to said arm, and a rope or cable wound around the pulley and capable of revolving said pulley.

2. In an airplane provided with retractable landing gear, the wheels of said landing gear being partly exposed below the wing when in retracted position, an extensible shield adapted to cover the entire exposed portion of the wheel when said wheel is in retracted position, and means for retracting said shields into the wing structure when said landing gear is to be extended.

3. In an airplane provided with retractable landing gear, the wheels of said landing gear being partly exposed below the wing when in retracted position, an extensible shield adapted to cover the entire exposed portion of the wheel when said wheel is in retracted position, and means for retracting said shields into the wing structure when said landing gear is to be extended, said extensible shield comprising two quarter sections revolvable in opposite directions around a common shaft, said shaft being in alinement with the landing wheel shaft when said landing gear is in retracted position.

4. In an airplane with retractable landing gear, the wheels of said landing gear being partly exposed below the wing surface when in retracted position, an extensible wind shield adapted to cover the wheel when in retracted position, and means for retracting the wind shield within the wing structure when it is desired to extend the landing gear.

5. In an airplane provided with retractable landing gear, the wheels of said landing gear being partly exposed below the streamline of said airplane when in retracted position, an extensible shield adapted to cover the front portion of each wheel when said gear is in retracted position, and means for retracting said shield upward within the wing structure simultaneously with the lowering of said wheel from said airplane.

WILLIAM BROWN.